US005866494A

United States Patent [19]
Kim et al.

[11] Patent Number: 5,866,494
[45] Date of Patent: Feb. 2, 1999

[54] HIGH DIELECTRIC CERAMIC COMPOSITION FOR COMPUTER MODULE

[75] Inventors: Ho-Gi Kim; Yung Park, both of Seoul; Yong-Joon Park, Taejon, all of Rep. of Korea

[73] Assignee: Korea Advanced Institute of Science and Technology, Taejon, Rep. of Korea

[21] Appl. No.: 910,433

[22] Filed: Aug. 13, 1997

[30] Foreign Application Priority Data

Aug. 13, 1996 [KR] Rep. of Korea ................. 96-33522

[51] Int. Cl.$^6$ ................................. C04B 35/468
[52] U.S. Cl. ................................. 501/139
[58] Field of Search ...................... 501/137, 139

[56] References Cited

U.S. PATENT DOCUMENTS

| | | | |
|---|---|---|---|
| 3,035,927 | 5/1962 | Janulionis | 501/139 |
| 4,330,631 | 5/1982 | Kawashima et al. | 501/139 |
| 4,550,891 | 11/1985 | Ayusawa et al. | 501/139 |
| 4,699,891 | 10/1987 | Sato et al. | 501/139 |

FOREIGN PATENT DOCUMENTS

| | | | |
|---|---|---|---|
| 57-170874 | 10/1982 | Japan | 501/139 |
| 59-10951 | 1/1984 | Japan | G03G 5/14 |
| 59-086101 | 5/1984 | Japan | 501/139 |

OTHER PUBLICATIONS

Y. Park and S. A. Song, Influence of Core–Shell Structured Grain on Dielectric Properties of Cerium Modified Barium Titanate, J. Mater. Sci.: Mater. in Elec., 6: 380–388 (1995), no month avail.

Y. Park and Y. H. Kim, The Dielectric Temperature Characteristic of Additives Modified Barium Titanate Having Core shell Structured Ceramics, J. Mater. Res., 10:2770–2776 (1995), no month avail.

*Primary Examiner*—David Brunsman
*Attorney, Agent, or Firm*—Knobbe, Martens, Olson & Bear, LLP

[57] ABSTRACT

The present invention relates to a laminated ceramic composition which has a high dielectric constant and a low decrease rate of dielectric constant at DC bias, which can be used for bypass of computer module IC. The present invention provides a ceramic condenser composition which comprises $BaTiO_3$, $TiO_2$, $CeO_2$ and $Sm_2O_3$ by the molar ratio to satisfy the equation of $(1-X-Y)BaTiO_3-X(CeO_2)-Y(Sm_2O_3)-(1.5X+3Y)TiO_2$ (wherein, $0.01<X+Y<0.05$ and $0.015<1.5X+3Y<0.15$). The composition has an excellent dielectric characteristics, since it has a high dielectric constant of 7000 or more at a temperature range of 50° to 70° C. which permits normal operations of IC, and a decrease rate of dielectric constant of below 10% at DC bias of 1 V/$\mu$m. Accordingly, the ceramic composition of the invention can be applied for the development of a laminated ceramic condenser for bypass of computer module IC.

3 Claims, No Drawings

HIGH DIELECTRIC CERAMIC COMPOSITION FOR COMPUTER MODULE

FIELD OF THE INVENTION

The present invention relates to a laminated ceramic condenser composition for computer module, more specifically, to a laminated ceramic composition which has a high dielectric constant and a low decrease rate of dielectric constant at DC bias, which can be used for bypass of computer module IC.

BACKGROUND OF THE INVENTION

The recent tendency for electronic components to be light, thin and small has resulted in an increase in surface mounting densities of computer modules IC's employed therein, and other components. Therefore, a laminated ceramic condenser used for bypass is positioned right under the IC. Laminated ceramic compositions which have a high dielectric constant at a temperature range of 50° to 70° C. which permits normal operations of the IC, and in addition, have a low decrease rate of dielectric constant at DC bias have been required in the art.

Many efforts to develop a novel ceramic composition satisfying the said requirements have been made by the researchers. For example, Japanese unexamined patent publication Nos. (sho) 55-34965, (sho) 59-10951 and (sho) 60-51206 disclose that compositions prepared by adding $CeO_2$ and $TiO_2$ to a main component of $BaTiO_3$ have excellent DC bias characteristics when compared to conventional high dielectric compositions. However, these prior art compositions are proven to be less satisfactory in the senses that the compositions have dielectric constants of below 3000 at a temperature of 60° C. and the dielectric constants decrease rapidly at DC bias voltage, which gives rise to many crucial problems in the functioning of computer module IC bypass.

SUMMARY OF THE INVENTION

The present inventors have made an effort to solve the said problems, and finally, they prepared a dielectric ceramic composition by adding $CeO_2$ and $Sm_2O_3$ belonging to rare earth metal oxide simultaneously to a mixture of $BaTiO_3$ and $TiO_2$, and discovered that the composition has excellent dielectric characteristics, that is, it has a high dielectric constant of 7000 or more at a temperature range of 50° to 70° C. which permits normal operations of computer module IC, and a low decrease rate of dielectric constant which is below 10% at DC bias of 1 V/$\mu$m.

A primary object of the present invention is, therefore, to provide a laminated ceramic condenser composition for computer module which comprises $BaTiO_3$, $TiO_2$, $CeO_2$ and $Sm_2O_3$, and has an excellent dielectric characteristics and highly improved DC bias characteristics.

DETAILED DESCRIPTION OF THE INVENTION

In order to prepare a ceramic composition which has a high dielectric constant at a temperature range of 50° to 70° C. and an extremely low decrease rate of dielectric constant at DC bias voltage, $BaTiO_3$, $TiO_2$, $CeO_2$ and $Sm_2O_3$ were weighed by the molar ratio to satisfy the following equation:

$$(1-X-Y)BaTiO_3-X(CeO_2)-Y(Sm_2O_3)-(1.5X+3Y)TiO_2$$

wherein, 0.01<X+Y<0.05 and 0.015<1.5X+3Y<0.15.

And then, the components are mixed, dried and ground to prepare a laminated ceramic condenser composition of the invention.

In order to investigate dielectric characteristics of the said composition, sheets were made of the composition prepared as aboves by employing a binder of polyvinylalcohol, and laminated ceramic condensers of 1 mm-thickness were prepared, and sintered at a temperature range of 1300° to 1500° C. to be shrunk sufficiently. And then, dielectric constants and loss rates of the samples thus prepared were determined, and changes in dielectric constants during application of DC bias were also examined. As a result, the composition has been proven to be an excellent laminated ceramic condenser composition for computer module which has a dielectric constant of 7000 or higher at 60° C., and a loss rate of 2 or below and a decrease rate of dielectric constant of below 10% at DC bias of 1 V/$\mu$m. In addition, it was discovered that the composition has been shrunken sufficiently after sintering with a good performance.

Accordingly, the laminated ceramic condenser composition of the invention can be used for bypass of computer module IC, since it has successfully overcome the disadvantages of the conventional compositions whose dielectric constant is low, i.e., 3000 to 4000, at a temperature range of 50° to 70° C. which permits normal operations of computer module IC, and whose dielectric constant at DC bias voltage decreases rapidly.

The present invention is further illustrated by the following examples, which should not be taken to limit the scope of the invention.

EXAMPLES 1 to 8

In order to prepare laminated ceramic condenser compositions for computer module, $BaTiO_3$, $TiO_2$, $CeO_2$ and $Sm_2O_3$ with purities of 99% or more were weighed according to the composition ratios shown in Table 1 below. Each of the powder thus weighed was mixed for about 2 hours, with a planetary mill employing nylon jar and zirconium oxide ball, while using a dispersion media of distilled water and then the mixed slurry was dried.

In order to investigate dielectric characteristics of the compositions thus prepared, sheets of 30 $\mu$m-thickness were prepared with samples of the compositions by employing a binder of polyvinylalcohol. And then, the sheets were laminated in 5 layers, and laminate ceramic condensers having 3 mm-length, 4 mm-width and 1 mm-thickness were prepared using a palladium internal electrode. Then, binders were burn out, and the condensers were sintered at a temperature range of 1300 to 1500° C. for 2 hours to be shrunk sufficiently. As a result, 5-layer laminated ceramic condensers of Examples 1 to 8 whose distance between the layers is 25 $\mu$m were prepared. Both sides of the samples thus prepared were polished to give flat surfaces, covered with silver paste, and sintered at 800° C. Then, their dielectric constants, loss rates and rates of change in dielectric constant at DC bias of 1 V/$\mu$m were determined respectively, at a bath of constant temperature(60° C., 1 kHz) and humidity, by employing HP4294A LCR Meter(Hewlett-Packard, USA), and the results were shown in Table 1 below. In this connection, the rate of change in dielectric constant at DC bias of 1 V/$\mu$m was determined, after the rate at DC bias of 25 or 40 V was calculated by using the following equations:

DC bias at 25 V(%)=($C_{25}$-$C_0$)/$C_0$×100

DC bias at 40 V(%)=($C_{40}$-$C_0$)/$C_0$×100 wherein, $C_{25}$ is a dielectric constant at 60° C., 1 kHz and DC bias of 25 V;

$C_{40}$ is a dielectric constant at 60° C., 1 kHz and DC bias of 40 V; and, $C_0$ is a dielectric constant at 60° C., 1 kHz and DC bias of 0 V.

Comparative Examples 1 to 5

Laminated ceramic condenser compositions for computer module were prepared analogously as in Examples 1 to 8, with the variation of the composition ratio shown in Table 1 below. And then, their dielectric constants, loss rates and DC bias characteristics were determined, respectively. The obtained results were disclosed in Table 1.

As can be seen in Table 1, it was found that: the dielectric constant at 60° C. is relatively low and the loss rate is relatively high, when (1−X−Y) value of $BaTiO_3$ is below 0.95 or higher than 0.99; and, the decrease rate of dielectric constant at DC bias of 1 V/$\mu$m is undesirebly high, or the dielectric constant at 60° C. decreases rapidly, when $CeO_2$ or $Sm_2O_3$ is added alone as a modulator of temperature characteristics of dielectric constant, or the (X+Y) value of $CeO_2$ and $Sm_2O_3$ is 0.05 or more. Moreover, it was revealed that: sufficient shrinkage after sintering is not accomplished when (1−X−Y) value of $BaTiO_3$ is 0.99 or more, or (1.5X+3Y) value of $TiO_2$ is 0.015 or more; and, sintered state is poor when (1.5X+3Y) value of $TiO_2$ is below 0.15.

From the results shown in Table 1, it was clearly determined that a dielectric ceramic composition which satisfies 0.01<X+Y<0.05 and 0.015<1.5X+3Y<0.15, in the equation of $(1-X-Y)BaTiO_3-X(CeO_2)-Y(Sm_2O_3)-(1.5X+3Y)TiO_2$, has a high dielectric constant of 7000 or more at a temperature range of 50° to 70° C. which permits normal operations of IC, and a decrease rate of dielectric constant of below 10% at DC bias of 1 V/$\mu$m. Thus, the ceramic composition can be practically applied for bypass of computer module IC.

As clearly illustrated and demonstrated above, the present invention provides a ceramic condenser composition which comprises $BaTiO_3$, $TiO_2$, $CeO_2$ and $SM_2O_3$ by the molar ratio to satisfy the equation of $(1-X-Y)BaTiO_3-X(CeO_2)-Y(Sm_2O_3)-(1.5X+3Y)TiO_2$(wherein, 0.01<X+Y<0.05 and 0.015<1.5X+3Y<0.15). The composition has excellent dielectric characteristics, since it has a high dielectric constant of 7000 or more at a temperature range of 50° to 700° C., and a decrease rate of dielectric constant of below 10% at DC bias of 1 V/$\mu$m. Accordingly, the composition of the invention can be applied for the development of a laminated ceramic condenser for bypass of computer module IC.

What is claimed is:

1. A laminated ceramic condenser composition for computer module which comprises each of the following four compounds: $BaTiO_3$, $TiO_2$, $CeO_2$ and $Sm_2O_3$, wherein the four compounds are in the following molar ratios:

$$(1-X-Y)BaTiO_3-X(CeO_2)-Y(Sm_2O_3)-(1.5X+3Y)TiO_2$$

wherein, 0.01<X+Y<0.05 and 0.015<1.5X+3Y<0.15.

2. The laminated ceramic condenser composition of claim 1 which has a dielectric constant of 7000 or more at 60° C., and a decrease rate of dielectric constant of below 10% at DC bias of 1 V/$\mu$m.

3. The laminated ceramic condenser composition of claim 1 which is sintered at a temperature range of 1300 to 1500° C.

TABLE 1

Dielectric constants, loss rates and DC bias characteristics of the laminated ceramic condenser compositions

| | Components and composition ratios | | | | Sintering | Dielectric constant | Loss rate | DC bias | DC bias |
|---|---|---|---|---|---|---|---|---|---|
| | $BaTiO_3$ 1−X−Y | $CeO_2$ X | $Sm_2O_3$ Y | $TiO_2$ 1.5X+3Y | temperature (°C.) | at 60° C. and 1 kHz | at 60° C. and 1 kHz | at 25 V (%) | at 40 V (%) |
| Example 1 | 0.97 | 0.01 | 0.02 | 0.075 | 1340 | 8300 | 1.5 | 4 | 5.2 |
| Example 2 | 0.98 | 0.01 | 0.01 | 0.045 | 1320 | 7800 | 1.2 | 5 | 8.1 |
| Example 3 | 0.98 | 0.015 | 0.005 | 0.0375 | 1320 | 7750 | 1.6 | 6.5 | 10.6 |
| Example 4 | 0.983 | 0.01 | 0.007 | 0.036 | 1330 | 7550 | 1.7 | 4.3 | 4.9 |
| Example 5 | 0.965 | 0.03 | 0.005 | 0.06 | 1300 | 7600 | 1.3 | 6.2 | 8.8 |
| Example 6 | 0.97 | 0.015 | 0.015 | 0.0675 | 1290 | 8200 | 1.9 | 4.2 | 6.3 |
| Example 7 | 0.97 | 0.01 | 0.02 | 0.075 | 1290 | 8400 | 1.8 | 7.0 | 6.9 |
| Example 8 | 0.98 | 0.01 | 0.01 | 0.045 | 1320 | 8150 | 2.2 | 5 | 10 |
| Comparative Example 1 | 0.93 | 0.07 | 0 | 0.105 | 1280 | 2300 | 1.0 | 35 | 36.2 |
| Comparative Example 2 | 0.955 | 0.0025 | 0.0025 | 0.01125 | 1360 | 3400 | 4.3 | 35 | 40 |
| Comparative Example 3 | 0.97 | 0.03 | 0 | 0.045 | 1320 | 8120 | 2.5 | 20 | 31.3 |
| Comparative Example 4 | 0.98 | 0.00 | 0.02 | 0.06 | 1330 | 7900 | 2.7 | 20 | 34.4 |
| Comparative Example 5 | 1.00 | 0 | 0 | 0 | 1420 | 3200 | 5.5 | 73 | 56.3 |

* * * * *